United States Patent
Edelstein et al.

(10) Patent No.: US 12,242,799 B2
(45) Date of Patent: Mar. 4, 2025

(54) SYSTEM AND METHOD FOR REVIEWING AND EVALUATING DISCREPANCIES BETWEEN TWO OR MORE DOCUMENTS

(71) Applicant: The Bank of Nova Scotia, Toronto (CA)

(72) Inventors: Barak Edelstein, Toronto (CA); Patrick Allan Heiland, Toronto (CA); Andrew Gordon Storey, Toronto (CA); Yannick Lallement, Toronto (CA); Ajinkya Kulkarni, Toronto (CA); Min Li, Toronto (CA); Tanaby Zibamanzar Mofrad, Toronto (CA); Saif Charaniya, Toronto (CA); Andrew Peter Kujtan, Toronto (CA); Pragnya Addala, Toronto (CA); Simrandeep Singh, Toronto (CA)

(73) Assignee: The Bank of Nova Scotia, Toronto (CA)

( * ) Notice: Subject to any disclaimer, the term of this patent is extended or adjusted under 35 U.S.C. 154(b) by 0 days.

(21) Appl. No.: 17/842,377

(22) Filed: Jun. 16, 2022

(65) Prior Publication Data
US 2023/0409823 A1    Dec. 21, 2023

(51) Int. Cl.
*G06F 40/194* (2020.01)
*G06F 40/106* (2020.01)
(Continued)

(52) U.S. Cl.
CPC .......... *G06F 40/194* (2020.01); *G06F 40/106* (2020.01); *G06F 40/205* (2020.01); *G06F 40/284* (2020.01); *G06F 40/295* (2020.01)

(58) Field of Classification Search
CPC .... G06F 40/194; G06F 40/106; G06F 40/205; G06F 40/284; G06F 40/295
See application file for complete search history.

(56) References Cited

U.S. PATENT DOCUMENTS

| | | |
|---|---|---|
| 5,418,951 A | 5/1995 | Damashek |
| 8,515,939 B2 | 8/2013 | Chen et al. |

(Continued)

OTHER PUBLICATIONS

"The Rise of Middle Office Outsourcing in Asia" by Alan Fong, published Aug. 19, 2020 and retrieved from https://www.business.hsbc.com.ph/en-gb/insights/managing-cash-flow/middle-office-outsourcing-in-asia (Year: 2020).*

(Continued)

*Primary Examiner* — Sanchita Roy
(74) *Attorney, Agent, or Firm* — Laurie Wright; Christopher N. Hunter; Blake, Cassels & Graydon LLP (57) ABSTRACT

The present disclosure pertains to a system and method for determining differences between at least two documents. A preferred embodiment disclosed herein pertains to a system and method for determining differences in the text or terms of legal documents, for example transactional legal agreements, such as but not limited to Trade Confirmations. The document review system can compare text documents to other text documents but is further capable of comparing text documents to structured spreadsheet data. The combination of static component verification in combination with dynamic component verification leads to a powerful tool which greatly reduces the time and efficient of document review while reducing the risk of human errors. Utilizing word embeddings in the static verification in combination with the use of named entity recognition, rule parsers in the dynamic verification, enables the system to produce concise and meaningful summaries of differences between multiple documents.

19 Claims, 6 Drawing Sheets

(51) Int. Cl.
    *G06F 40/205*     (2020.01)
    *G06F 40/284*     (2020.01)
    *G06F 40/295*     (2020.01)

(56) References Cited

U.S. PATENT DOCUMENTS

| | | |
|---|---|---|
| 9,892,111 B2 | 2/2018 | Danielyan et al. |
| 10,599,753 B1 * | 3/2020 | Eisner ................... G06F 40/197 |
| 10,979,456 B2 | 4/2021 | Hernandez et al. |
| 11,681,735 B2 * | 6/2023 | Roman ................. G06F 40/131 |
| | | 707/603 |
| 2002/0087454 A1 * | 7/2002 | Calo ...................... G06Q 30/06 |
| | | 705/37 |
| 2010/0318530 A1 * | 12/2010 | Massand ............... G06F 16/258 |
| | | 707/E17.014 |
| 2012/0209853 A1 | 8/2012 | Desai et al. |
| 2015/0081681 A1 | 3/2015 | Vohra et al. |
| 2017/0017641 A1 * | 1/2017 | Gidney ................. G06F 40/289 |
| 2018/0349332 A1 * | 12/2018 | Indenbom ............. G06F 40/194 |

OTHER PUBLICATIONS

Kagan, J; Automated Confirmation Transaction service—ACT; https://www.investopedia.com/terms/a/act.asp; Jan. 14, 2021.

Iyeow, L.; International Search Report from corresponding PCT Application No. PCT/CA2023/050846; search completed Aug. 21, 2023; mailed Aug. 29, 2023.

\* cited by examiner

| Review status | Status | Type of Break | Section Title of Break Location | Break Reference Text | Break Secondary Text |
|---|---|---|---|---|---|
| Awaiting maker | Outstanding | Singular plural mismatch | Opening | Movie theater | Movie theaters |
| Awaiting Maker | Outstanding | Spelling mismatch | Opening | 2022 | 2021 |
| Awaiting Further Authorization | Outstanding | punctuation mismatch | Change in law | and/or | and-or |

Figure 4

| Review status | Status | Type of break | Section title | Break template text | Break secondary text |
|---|---|---|---|---|---|
| Awaiting maker | Outstanding | Singular plural mismatch | Opening | Movie theaters | Movie theater |
| Awaiting Maker | Outstanding | Spelling mismatch | Opening | 2004 | 2000 |
| Awaiting Maker | Outstanding | Extra text | Opening | | and everyday purchases |
| You will earn 4% on the first $25,000 you spend annually at [movie theaters] and [on everyday purchases]. | | | | | |

Figure 5

| Review status | Status | Type of break | Section title | Break reference table text | Break secondary text |
|---|---|---|---|---|---|
| Awaiting maker | Outstanding | Economic mismatch | Table 1 | 3/9/2022 | March 10, 2022 |
| Awaiting Checker | Outstanding | Economic pattern | Table 2 | 3/9/2022 | // |
| Complete | Rectified | Economic missing row | Table | | CAD |
| Awaiting Maker | Outstanding | Economic mismatch | Table 1 | 1.32 | 1.23 |

| Start Date | Interest Rate | commison | Exchange Rate | Minimum Payment |
|---|---|---|---|---|
| 3/9/2022 | 4 | 2 | 1.32 | 1000 |

Figure 6

SYSTEM AND METHOD FOR REVIEWING AND EVALUATING DISCREPANCIES BETWEEN TWO OR MORE DOCUMENTS

FIELD OF THE DESCRIPTION

The description is directed to a system and method for the automated review of documents. In particular, the description is directed to a method for the automated review of legal transactional agreements.

BACKGROUND

In many applications, particularly in the legal field, agreements or contracts contain standard terms and conditions with some acceptable variations, as well as variable deal specific terms. Often a comparison of documents to a standard template is required in order to determine the similarity thereto and to evaluate the significance of identified differences. Traditionally, document similarity computation usually involves statistics and machine learning, such as, document classification, or clustering.

While comparison of documents to a standardized template is common in many legal agreements, it is particularly relevant in the trade of over-the-counter derivatives and other trade agreements.

Over-the-counter derivatives, for example, are negotiated between counterparties or through a broker without going through an exchange. Therefore, over-the-counter derivatives could be negotiated and customized.

In some scenarios one counterparty to the trade drafts a legal transactional agreement, named a trade confirmation, outlining the terms of the over-the-counter derivatives transaction, with the other counterparty manually reviewing the drafted confirmation to ensure it conforms with their approved terms and conditions and correctly captures the executed trade. An approval team would manually compare the drafted confirmation to an approved reference document in a word-by-word manner, and similarly to the trade booking. This process is time consuming and can introduce operational risk. In particular, since the review is done manually, there is a chance for the introduction of human error. For example, a reviewer may miss a significant difference between the desired legal or trade terms and the counterparty drafted confirmation. This review is conducted by several individuals to reduce the risk of error. Conversely, the review may identify acceptable or meaningless differences.

There remains a need for a system and method for automatically reviewing and evaluating legal documents.

SUMMARY OF THE DESCRIPTION

Disclosed herewith is a system and method for reviewing documents, the method comprising the steps of selecting at least one reference document, selecting a secondary document to compare to the reference document, conducting an analysis of the static components in secondary document compared to the at least one reference document, conducting an analysis of the dynamic components of the secondary document compared to the at least one reference document, presenting any meaningful differences to a user for evaluation for acceptance or rejection and storing the criteria of the acceptance or rejection in a database for recall in future evaluations.

In a further embodiment, the analysis of the static components comprises aligning sentences in the reference document with sentences having similar content in the secondary document and evaluating the content of the aligned sentences to determine if there are any meaningful differences.

In yet a further embodiment, the at least one reference document comprises two reference documents, a static reference document for completing the analysis of the static components of the secondary document and a dynamic reference document for completing the analysis of the dynamic components of the secondary document.

In yet a further embodiment, the static reference document is a text document and the dynamic reference document is a structured data spreadsheet.

In yet a further embodiment, the dynamic analysis comprises using a rule parser to identify which data to be extracted from the secondary document and dynamic reference document.

In yet a further embodiment, the dynamic analysis further comprises using named entity recognition to categorize dynamic elements of the secondary document for comparison to similar categories in the dynamic reference document.

In yet a further embodiment, the differences are presented to the user in the form of a chart.

In yet a further embodiment, the chart contains a viewer for displaying the portion of the at least one reference document or the secondary document which contains a difference.

In yet a further embodiment, the static reference document is a trade confirmation template, the secondary document is a trade confirmation and the dynamic reference document is the Global Banking and Market's book of record for the relevant trade.

The disclosure also pertains to a system for reviewing documents comprising, a memory device that stores computer executable components, and a processor that executes the computer executable components stored in memory. The computer executable components comprise a comparator component for determining differences in at least one reference document and a secondary document. The comparator processes, via the processor, a comparison of the static components of the at least one reference document with the secondary document, and a comparison of the dynamic components of the at the least one reference document with the secondary document and identifies differences between the at least one reference document and the secondary document and presents the differences for review by a user.

In a further embodiment, the system comprises a record of rules associated with a particular reference document for recording differences previously determined as acceptable on an on-going basis. The processor accesses the rules and omits the differences previously determined as acceptable on an on-going basis from the identified differences to be presented to the user for review.

In a further embodiment, the analysis of the static components comprises aligning sentences in the reference document with sentences having similar content in the secondary document and evaluating the content of the aligned sentences to determine if there are any meaningful differences.

In a further embodiment, the at least one reference document comprises two reference documents, a static reference document for completing the analysis of the static components of the secondary document and a dynamic reference document for completing the analysis of the dynamic components of the secondary document.

In a further embodiment, the static reference document is a text document, and the dynamic reference document is a structured data spreadsheet.

In a further embodiment, the dynamic comparison comprises using a rule parser to identify which data to be extracted from the secondary document and dynamic reference document.

In a further embodiment, the dynamic comparison uses named entity recognition to categorize dynamic elements of the secondary document for comparison to similar categories in the dynamic reference document.

In a further embodiment, the differences are presented to the user in the form of a chart.

In a further embodiment, the chart contains a viewer for displaying the portion of the at least one reference document or the secondary document which contains a difference.

In a further embodiment, the system further comprises a database for storing reference templates and rules previously identified as acceptable associated with a particular reference template.

In a further embodiment, the static reference document is a trade confirmation template, the secondary document is a trade confirmation, and the dynamic reference document is the Global Banking and Market's book of record for the relevant trade.

BRIEF DESCRIPTION OF THE FIGURES

The features of certain embodiments will become more apparent in the following detailed description in which reference is made to the appended figures wherein.

DETAILED DESCRIPTION

The present disclosure pertains to a system and method for determining differences between at least two documents. The system identifies differences in the text or context of the documents. A preferred embodiment disclosed herein pertains to a system and method for determining differences in the text or terms of legal documents, for example transactional legal agreements, such as but not limited to Trade Confirmations, such as trade confirmations for Over-the-Counter derivative transactions. The document review system can compare text documents to other text documents but is further capable of comparing text documents to structured spreadsheet data.

According to one embodiment, the system comprises a memory that stores computer executable components and a processor that executes the computer executable components of the system that is stored in the memory. The computer executable components comprise a comparator component for comparing a reference document to at least one secondary document to be compared to the reference document. The system can further comprise a database of reference documents, and an acceptor with a database of rules associated with each reference document to be executed when comparing a secondary document to the reference document.

Figure 1:
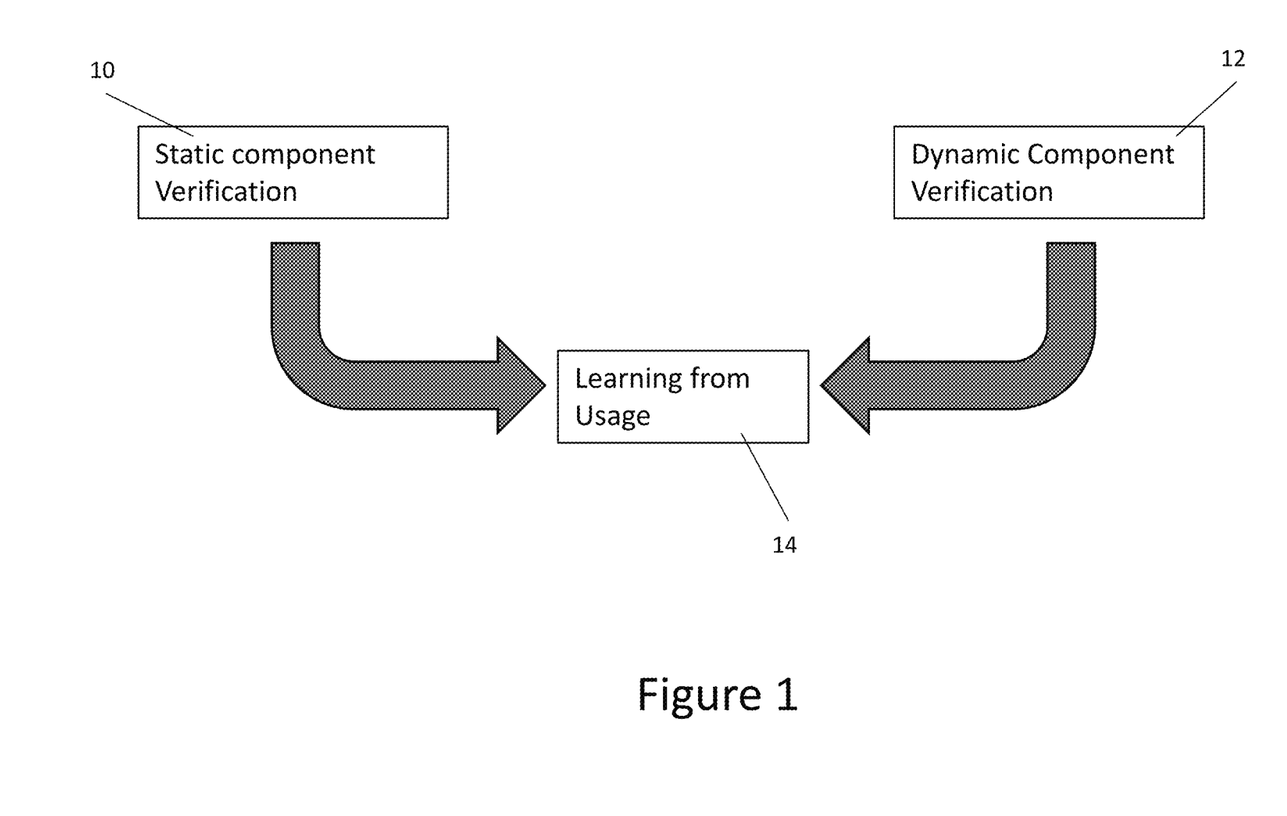
FIG. 1 is a schematic of the overall components of the method of reviewing a document.

Many agreements, for example those in the legal and/or financial field, have standard templates which include wording and formatting that is used repeatedly for the same type of agreement. For example, in market trades, each counterparty has their own template language for trade confirmations. This standard wording of the agreement is herein referred to as static components. There are, however, terms in legal agreements which are subject to change, for example, dates, percentage commission, interest, conversion rates, etc. These elements that are subject to change based on the particulars of a certain legal agreement are herein called dynamic components. As shown in FIG. 1, the system and method of document review described herein, includes both static component verification 2 and dynamic component verification 4. The review system uses past decisions 6 to learn how to more efficiently review documents, saving the user time as will be described below.

Figure 2:
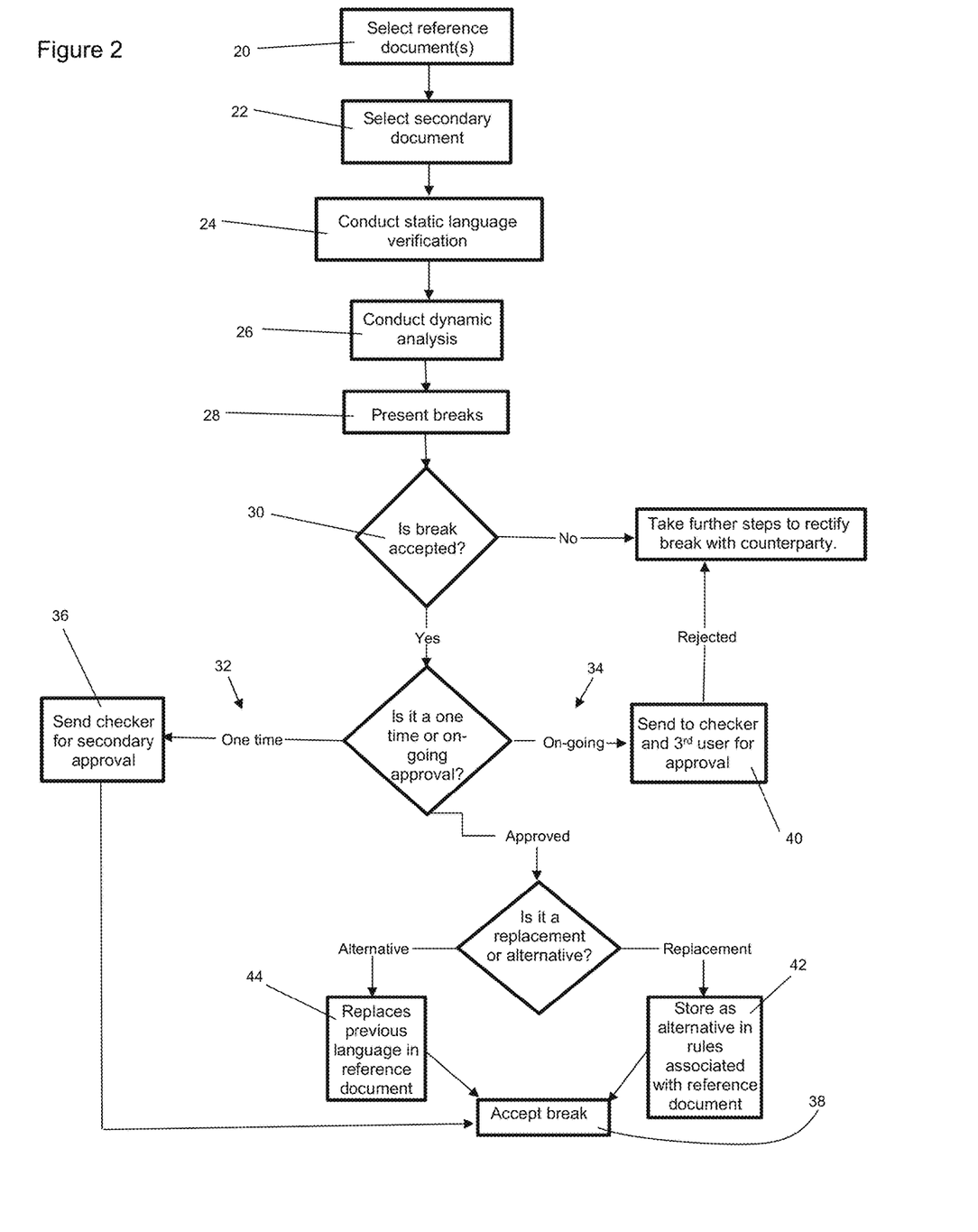
FIG. 2 is a flow diagram of the steps of the review method.

With reference to FIG. 2, the process starts with the selection of a reference document 20, or in some embodiments, multiple reference documents. For example, one reference document could be used for the static component verification and a second reference document or reference chart could be used as a reference for the dynamic component. In step 22, a secondary document, which is to be compared to the reference document, is selected and/or uploaded in to they system. Once both the reference document and the secondary document have been selected, the static verification 24 and dynamic verification 26 are conducted. While these are shown as two separate steps in FIG. 2, it can be appreciated that they could be done simultaneously. In another embodiment, the dynamic analysis is conducted prior to the static language verification.

Static Verification

As described above, the static verification process 24 compares the elements of the secondary document that should remain unchanged compared to the reference document. Examples of static components include but are not limited to, legal clauses, references to legislation, and other standard language found in legal documents. The static verification step 24 of the review process identifies differences between the secondary document and reference document relating to, for example, spelling, text alignment, punctuation, capitalization, spacing, order of clauses, deleted words, inserted words, verb tense differences, and plural and singular nouns.

In order to assess the static components of a secondary document, a reference document must be specified. It begins with an initial set up wherein templates of example reference documents are uploaded into the system. A standard template which contains all the terms or clauses in an agreement, is uploaded into the system. These templates are used as the "gold standard" or reference document to which future documents will be compared. They contain all of the static terms which will generally not change for the majority of review analysis' and are used as the reference document during the static analysis portion of the comparison method. Because the reference documents are used as a standard of comparison, they are preferably carefully reviewed and approved by the relevant parties before uploading in the reference document into the document review system. Each reference document is preferably stored within the system memory, however it can be appreciated that the reference documents could be uploaded at the time of analysis, stored on a cloud or in any other way known to a person skilled in the art.

While some secondary documents may be very similar to a reference document, this is not always the case. In many embodiments, the reference document and secondary document may contain the similar content, in different locations throughout the document, or may contain somewhat differing content. For example, the reference document may not have been updated and refers to old legislation while the more recent secondary document references the new legislation. The use of deep-learning Natural Language Processing technology is used to align paragraphs and/or sentences with similar subject matter. In the preferred embodiment, the paragraphs and sentences are compared at both a syntactic and semantic level using the natural language model called word embeddings. It can be understood that in other embodiments, the paragraphs and sentences are compared only at a semantic level. Word embedding, uses deep learning to assign a real-valued vector to represent each word in a project vector space. This learned representation of words based on their usage allows words with a similar meaning to have a similar representation. Thus, words with similar meanings are grouped together which allows the review system to compare the meaning and similarities of different sentences.

Figure 3:
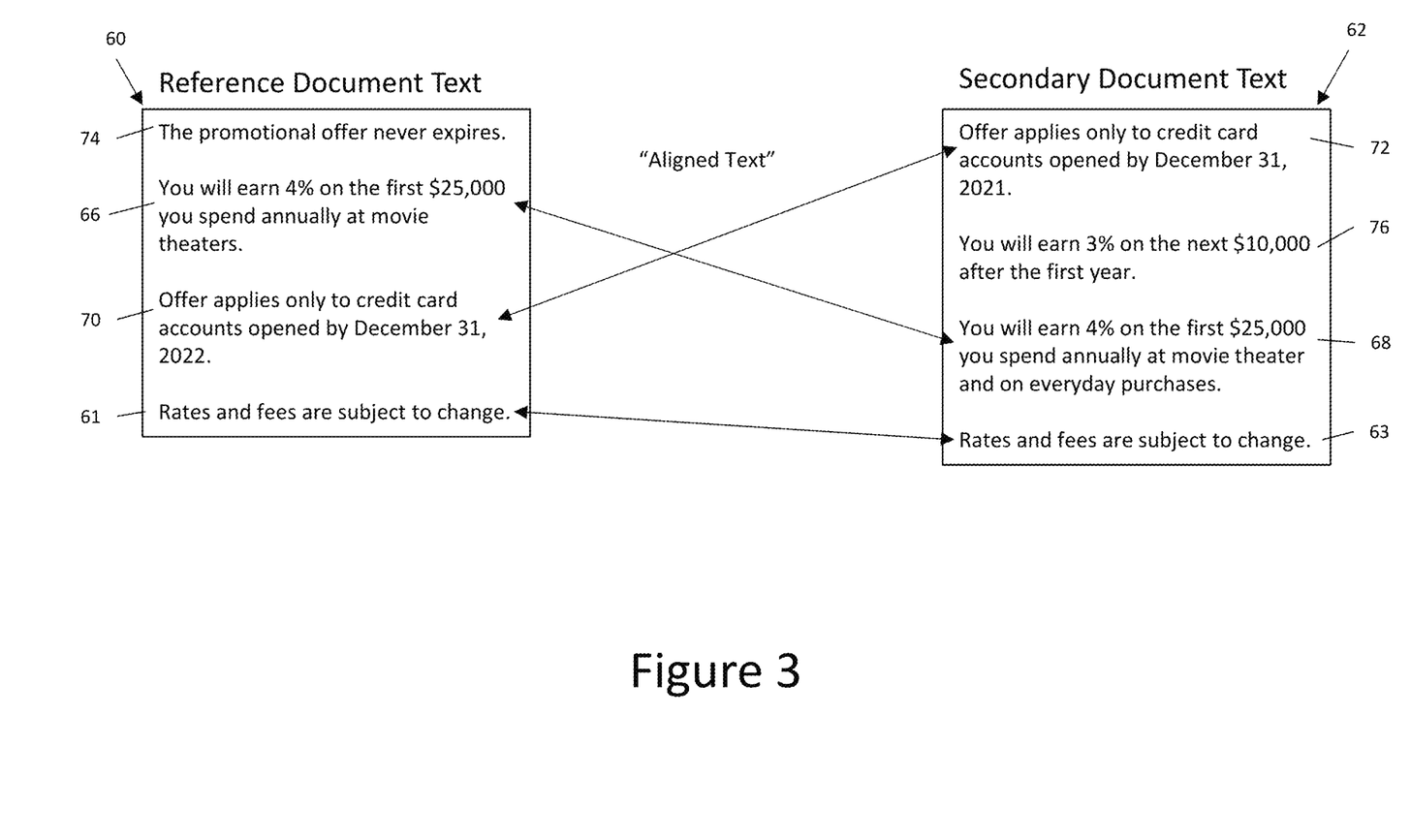
FIG. 3 is an example of how text in two documents are aligned.

The use of word embeddings allows the system to recognize differences between the reference document and the secondary document. As shown in FIG. 3, the system uses word embeddings to first determine similar paragraphs in the reference document 8 and secondary document 10 and "aligns" the paragraphs. In the example shown in FIG. 3, the fourth paragraph 11 of the reference document 8 aligns perfectly with the fourth paragraph 12 of the secondary document 10 as they are identical and in identical positions within the two documents. However, this is not always the case. For example, the second paragraph 13 of the reference document is aligned with the third paragraph 14 of the secondary document 10. Similarly, the third paragraph of the reference document 8 is aligned with the first paragraph 16 of the secondary document 10.

The use of word embeddings allows for the alignment of the paragraphs even though the content of aligned paragraphs is not identical, but merely similar. Word embeddings allows the system to align the paragraphs with the highest degree of similarity. The system then, by default, also identifies paragraphs that are omitted. In FIG. 3, the first paragraph 74 of the reference document 60 has no corresponding aligned paragraph in the secondary document 62. In the same way, the second paragraph 76 of the secondary document 62, has no corresponding aligned paragraph in the reference document 60. In this way, the analysis and alignment of paragraphs is bi-lateral, meaning the reference document is compared to the secondary document, and the secondary document is also compared to the reference document. This allows both additions to the secondary document and omissions in the secondary document to be identified. The system the uses word embedding to detect and align similar individual sentences in each paragraph of each document. By comparing aligned sentences, the system detects which sentences, if any, may have been modified, added or omitted in the amended document.

Dynamic Verification

The dynamic verification process 26 compares the entities of the secondary document can change for each individual analysis. Examples of dynamic entities include but are not limited to, currency, dates, times, party names, conversion rates, interest rates, and commissions.

The dynamic components of a secondary document are typically verified relative to a second reference document. Thus, to start the dynamic verification, the second reference document must be specified. In some embodiments, the second reference document is uploaded into the system while in other embodiments, the second reference document is automatically imported from a know internal or external database. This can be retrieved in any known manner, for example via a private network or via the internet. In the example of market trades, the second reference document is the Global Banking and Market's book of record the relevant information from which is imported into the system.

The dynamic verification portion of the review first extracts relevant dynamic entities from the secondary document using natural language processing, preferably named entity recognition. Every detected entity is classified into a predetermined category. For example, one dynamic entity could be "07/20/2022" and another could be "July 20, 2022" and named entity recognition would categorize both of these entities as "dates". While this the use of named entity recognition is preferred, other methods of detecting, parsing and/or categorizing relevant entities would be known to a person skilled in the art.

This method is particularly useful when comparing a text reference document to structured spreadsheet dataset, for example, but not limited to structured XML, JSON, RDF, CSV or other tabled data. The structured data is typically used as the reference document to which the dynamic entities identified in the secondary document are compared to the data in the structed dataset. This allows a user of the system to rectify any inconstancies in format or content between the extracted dynamic terms of the secondary document and the structured data element. For example, a date in the secondary document could be extracted as "September 1, 2020", while the same data in the structured data is "2020/09/01". Thus, all different formats for each data element must be considered. In a preferred embodiment, a rule parser is used to reconcile all the possible formats of each data element. A parsing rule can be assigned to each data field in the structured data to identify the type and format of data that needs to be extracted for comparison to the text document.

In the preferred embodiment, the analysis of the dynamic components is bi-lateral, meaning the reference document is compared to the secondary document, and the secondary document is also compared to the reference document. This allows both additions to the secondary document and omissions in the secondary document to be identified.

Breaks

Figure 4:
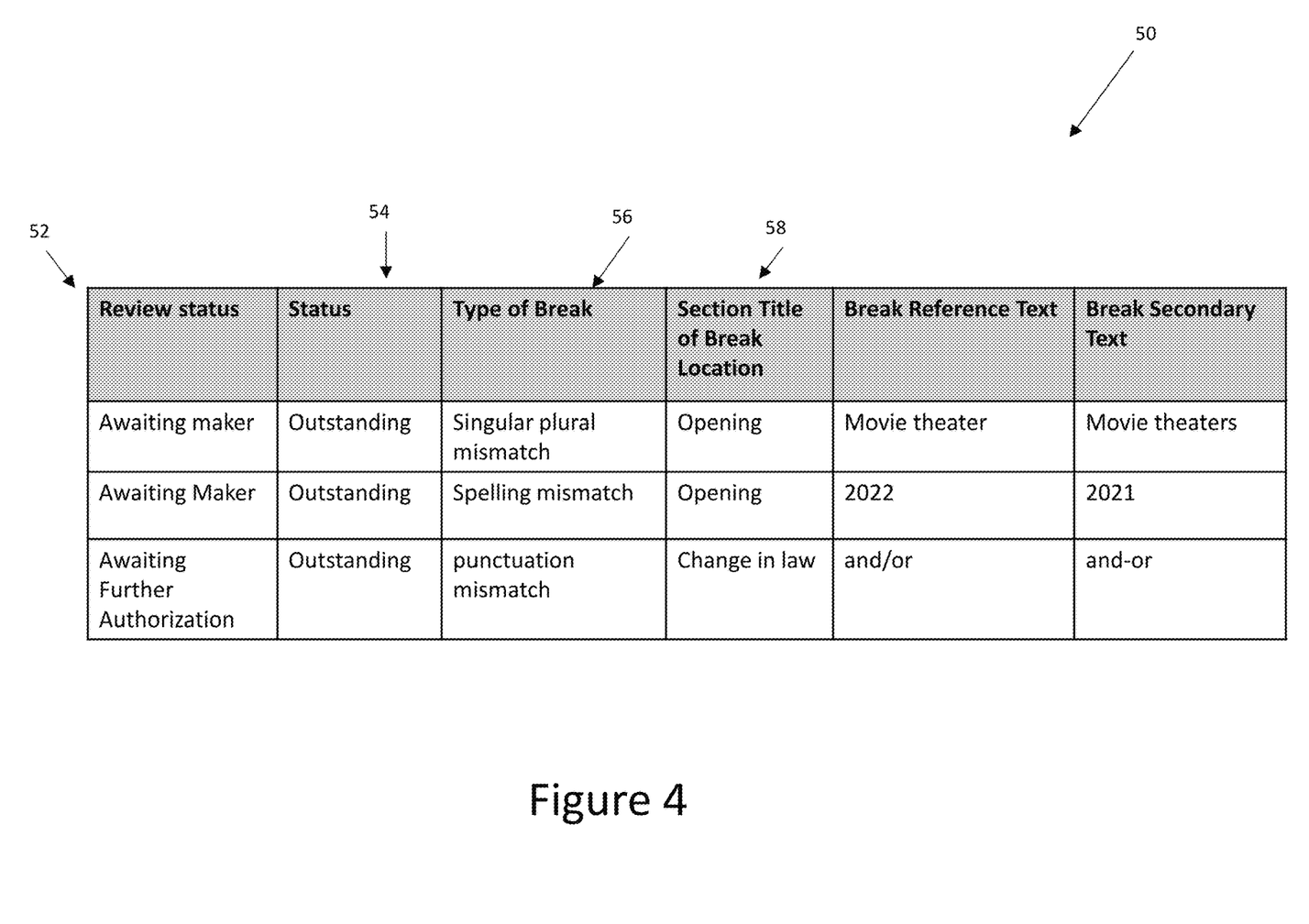
FIG. 4 is a chart showing details of static breaks.
Figure 5:
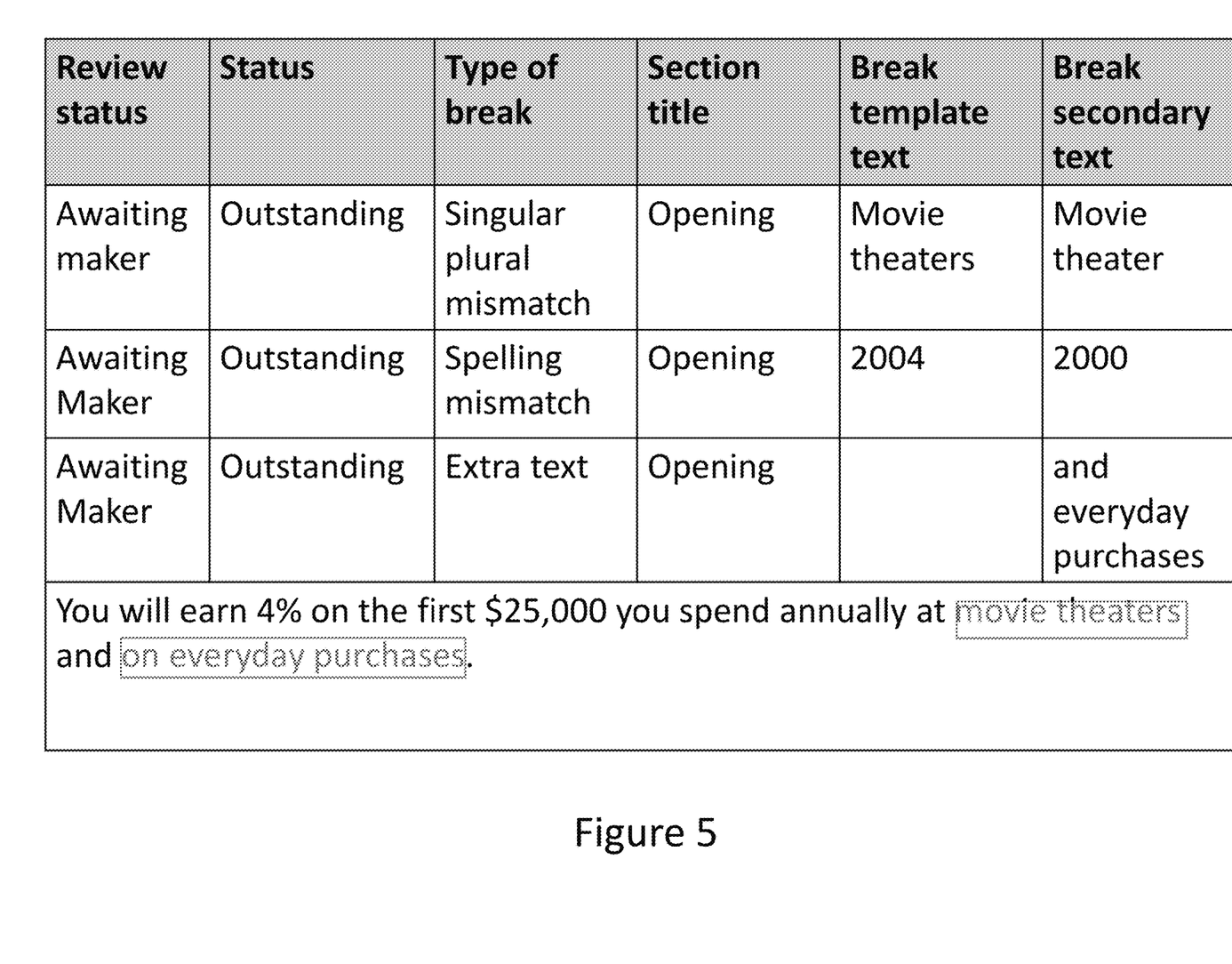
FIG. 5 is a chart showing details of static breaks and highlighting the area of discrepancy in the secondary or reference document.

Any differences between documents identified in either the static verification step 24 or dynamic verification step 26 are presented to the user for review (step 28 in FIG. 2). These differences, called breaks, are preferably displayed to the user in a concise and clear way to limit the time necessary to review each break. In the preferred embodiment, breaks are displayed to a user in via GUI an example of which is shown in FIGS. 4 and 5. The GUI enables user to easily click through each break to review the discrepancy and decide to accept or reject the breaks.

As seen in FIGS. 4 and 5, the breaks are preferably displayed as a chart 50. The summary chart 50 presents the details of the break in a clear and concise manner. For example, the chart 50 could include review status 52 to indicate if the break has been addressed, the status of the break 54, the type of break 56, the location of the break 58, reference text for the break 60 and the break text of the secondary document 62. While these particular details about static component breaks have been proposed, it can be understood that other details, for example page and/or line number of the break, or other details about the break.

The review status column 52 allows a user to quickly assess where of the review process has been completed. For example, "Awaiting Maker" would indicate to a user that the break has not been reviewed at all. A review status reads "Awaiting Checker" indicates that the Maker has suggested a change or acceptance of the break and it is awaiting approval by a second party (the Checker). A status of "Awaiting Further Authorization" would indicate that the Checker has approved but the break requires a third user to approve the break.

The Status column 54 can be used to indicate the current status of the decision regarding the break. For example, if no decision has been made, the status would be "outstanding". Once a decision has been made regarding the break, the status would change to "rectified" (see FIG. 6). A person skilled in the art would understand that the above statuses are examples only and other status indicators could be possible.

As the name implies, the Type of Break column 56 is used to indicate the nature of the break. For instance, "Alternate Patterns" could indicate a typo or difference in a character. Spelling Mismatch indicates a spelling error or discrepancy in a number. Further examples of types of breaks are summarized in the chart below. It can be understood that the types of breaks are not limited to the examples shown below but can be customized to the needs of a particular user or system.

the documents the break occurred. Alternatively, if the document does not have many headings, page numbers, line numbers or a combination thereof could be used in leu of the section title.

Break Reference text 60 and Break Secondary text 62 columns can be utilized to give the user a very quick comparison of the break text as it appears in the reference document and how it appears in the secondary document. In the preferred embodiment shown in FIG. 5, the GUI chart 50 further includes a viewer 64 to view the break in the secondary document or reference document with the break text highlighted 66. This reduces the time required for the user to find and assess the break. In one embodiment, the text displayed in the viewer 64 can be changed from the break in the secondary document to the break in the reference document by clicking on either the break reference text in column 60 or the text in the break secondary text in column 62.

Figure 6:
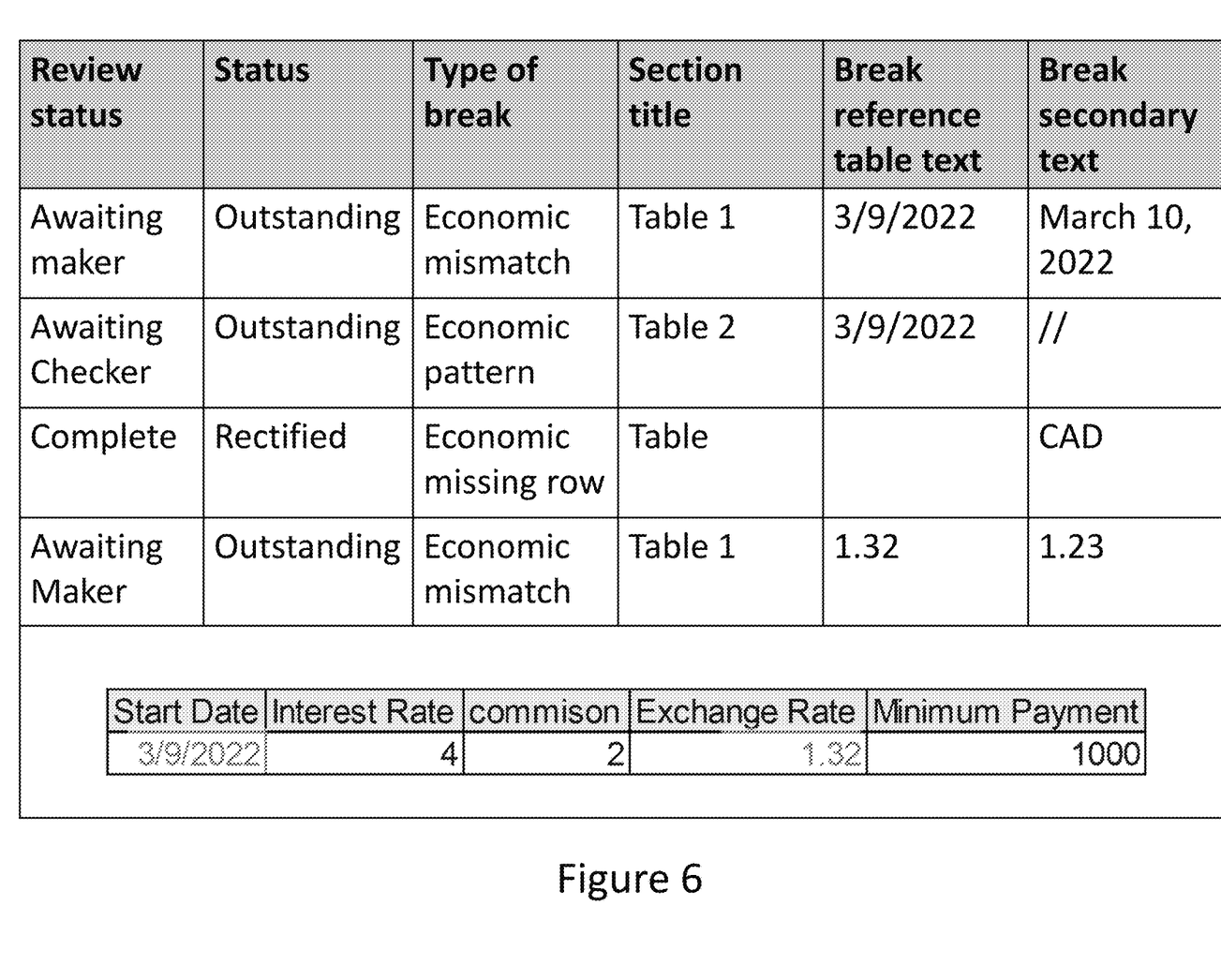
FIG. 6 is a chart showing details of dynamic breaks.

In one embodiment, the GUI chart 68, shown in FIG. 6, is used to easily summarize breaks between reference document in the form of a structured data spreadsheet and the secondary document. As with the static chart 60, the dynamic break chart 68 preferably summarizes review status 70, status 72, type of break 74, section title containing the break 76, break reference table text 78 and break secondary document text 80.

| Example Break Type Name | Explanation of Break Type |
| --- | --- |
| alternate patterns | There is a discrepancy in an expected pattern, for example a date in the format mm/dd/yy is not entered and simply "//" appears in secondary document |
| missing section | Entire clause or section missing from secondary document |
| missing sentence | Sentence missing from secondary document |
| missing text | Word or other text missing from secondary document |
| spelling mismatch | There is a difference in spelling of a word between the secondary and reference documents |
| additional sentence | An additional sentence is included in the secondary document |
| extra text | There is an additional word or text in the secondary document |
| additional section | There is an additional section in the secondary document |
| punctuation mismatch | There is a difference in punctuation between the secondary and reference document |
| spacing mismatch | There is a difference in spacing between the secondary and reference document |
| punctuation nonissue | The artificial intelligence incorporated into the system can be trained to recognize differences in punctuation between the secondary and reference documents which are inconsequential to the meaning of the agreement. While these breaks can be identified, they need not be displayed as a break in the user interface. An example of such a break is a missing comma or period that does not change the meaning of a sentence. |
| capitalization mismatch | There is a difference in capitalization between the secondary and reference document |
| incorrect sequence section | This break example occurs when there is a difference in the sequence of words, for example, Bank of Nova Scotia v. Nova Scotia Bank. |
| spacing nonissue | The artificial intelligence incorporated into the system can be trained to recognize differences in spacing between the secondary and reference documents which are inconsequential to the meaning of the agreement. While these breaks can be identified, they need not be displayed as a break in the user interface. |
| singular plural mismatch | This break occurs when a word is plural in either the reference or secondary document and singular in the other. |
| verb tense mismatch | There is a difference in verb tense between the secondary and reference document |

In one embodiment, a Section Title column 58 is used in the GUI chart 50 to give the user an indication of where in The type of break column 74 may contain further categories of breaks. For example, the break type "economic mismatch" could identify likely typos relating to the economics of the agreement, differences in dates, stock names, exchange names, issuer names, buyer names, etc. Alternatively, "economic patterns" could be used to identify differences in expected patterns. For example, as shown in FIG. 6, the reference document may show a date, such as "3/9/2022" while the secondary document has omitted the date and simply shows the "//" where the date was to be entered. A third example of an economic or dynamic break is "economic missing row". This is used when a dynamic component is missing from either the reference document or the secondary document, as shown in FIG. 6. While the above dynamic or economic break titles are used in the example provided, it can be appreciated that the naming and/or nature of the breaks should not be limited to the examples shown herewith but could be customized to the needs of the specific user or program.

As can be appreciated, the chart 68 showing dynamic breaks can include a viewer 82 which displays and highlights the breaks within the reference table or the secondary document.

While the figures show the static breaks and dynamic breaks as having separate review charts, it can be appreciated that both static and dynamic breaks could be visually represented in the same summary chart.

Accepting a Break

Breaks are either accepted or rejected by a first user, called a maker (see step 30 of FIG. 2) This acceptance or rejection of breaks 30 can be done as a one-time decision 32 or on an on-going basis 34. As shown in the process diagram shown in FIG. 2, in the preferred embodiment, each break is initially reviewed by the maker. The maker decides if the break should be approved or rejected 30. If the marker would like to approve the break, they indicate if the break should be approved on a one-time basis 32 for the particular document under review, or if the break is approved on an on-going basis 34 for all documents being compared to the current reference document. For one-time approvals, the maker first approves a break. It is then optionally sent to a second user, called a checker for confirmation of approval (step 36). Once the checker has approved, the break is accepted (step 38).

In the preferred embodiment, on-going acceptances 34 also require approval by both a maker and a checker. In another embodiment, additional approval, for example by a more senior analyst, may be required (see step 40). In one embodiment, approvals could require the password of an authorized person.

Requests for approvals can be integrated into a user's workflow. For example, once a maker approves a break, a workflow indicator may be automatically sent to the checker or other authorized person for review. This workflow indicator may utilize any suitable method, such as but not limited to instant message or email, or any other indication process known to a person skilled in the art.

On-going acceptance of breaks 34 can be approved in two different manners. As can be seen in FIG. 2, the on-going break language can be approved as a replacement for the corresponding reference text (step 42) or as an alternative to the corresponding reference text (step 44). If the on-going break language is a replacement for the reference text, the reference text document is amended to delete the original text corresponding to the break and replace it with the new approved text.

On-going breaks which are approved as an alternative to the corresponding reference text can be handled in a variety of ways known to a person skilled in the art. In the preferred embodiment, the system consists of a comparator which is used to run the artificial intelligence to compare the secondary and reference documents and identify breaks. The output of the comparator, specifically the breaks, is sent to and acceptor. The acceptor analyzes the breaks and determines which should be presented to the user via the GUI. The acceptor further stores any alternative text which has been accepted on an on-going basis. The acceptor compares the breaks to the accepted alternatives to determine if there are any breaks that are identical to the alternative text. If any of the breaks are part of the stored alternative text, the accepter does not include the identified accepted break in the output of breaks sent to the GUI. When an on-going break is approved as an alternative to the corresponding reference text, the alternative text is sent to the acceptor for storage, preferably in a database. Thus, if a break containing approved alternative text is identified in a future analysis, the acceptor will be able to identify it and accept the same without user input.

Once the appropriate revision to the reference document is complete, the break is accepted (step 38)

In a further preferred embodiment, the approved break changes are automatically incorporated into a mark up version of the secondary document. In this embodiment, once all the breaks are rectified, the completed mark up version of the secondary document is exported and sent to the relevant party for review. This mark up version of the secondary document can be sent either automatically with the rectification of all the breaks or the program and GUI can include a "send" options which can be activated by a user to send the mark up to the opposing party. It can be appreciated that the mark up can also include a review option wherein the secondary party can either accept or deny the proposed changes. An option to automatically sign the agreement with the approval of breaks can also be integrated into the system.

CONCLUSION

The above-described system is particularly advantageous for use in legal or financial applications, for example verifying market trades.

The combination of static verification in combination with dynamic component verification leads to a powerful tool which greatly reduces the time and efficient of document review while reducing the risk of human errors. Utilizing word embeddings in the static verification in combination with the use of named entity recognition, rule parsers in the dynamic verification, enables the system to produce concise and meaningful summaries of differences between multiple documents. This ensures that no meaningful difference is missed, without surfacing meaningless differences and makes it easy for reviewers to use. The use of the system and method further eliminates the need for a reviewer to conduct a review of the entire document. The system reduces the time required to review legal or financial agreements, such as trade confirmations and the associated operational risk. It is consistently accurately identifying a plurality of all issues in the secondary document, the nature of which can vary greatly. The time required to review and evaluate trade confirmations is further reduced by the continuous learning features which can cross reference breaks in a current analysis with those of previous evaluations. If the breaks are similar or the same, they are automatically accepted, negating the need for manual review.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art. Thus, the term "comprising" as used in this specification means "consisting at least in part of. When interpreting statements in this specification that include that term, the features, prefaced by that term in each statement, all need to be present but other features can also be present. Related terms such as "comprise" and "comprised" are to be interpreted in the same manner.

Unless stated otherwise herein, the article "a" when used to identify any element is not intended to constitute a limitation of just one and will, instead, be understood to mean "at least one" or "one or more"

Although the above description includes reference to certain specific embodiments, various modifications thereof will be apparent to those skilled in the art. Any examples provided herein are included solely for the purpose of illustration and are not intended to be limiting in any way. Any drawings provided herein are solely for the purpose of illustrating various aspects of the description and are not intended to be drawn to scale or to be limiting in any way. The scope of the claims appended hereto should not be limited by the preferred embodiments set forth in the above description but should be given the broadest interpretation consistent with the present specification as a whole. The disclosures of all prior art recited herein are incorporated herein by reference in their entirety.

We claim:

1. A method for reviewing documents, the method comprising;
   selecting at least one reference document;
   selecting a secondary document to compare to the reference document;
   conducting an analysis of the static components in secondary document compared to the at least one reference document;
   conducting an analysis of the dynamic components of the secondary document compared to the at least one reference document;
   presenting contextual differences between said reference document and said secondary document to a user for evaluation for acceptance or rejection; and
   storing criteria of the acceptance or rejection as a corresponding rule, in a rule database;
   selecting a third document to compare to the at least reference document,
   conducting an analysis of the static components in third document compared to the at least one reference document;
   conducting an analysis of the dynamic components of the third document compared to the at least one reference document;
   identifying contextual differences between said reference document and said third document;
   recalling the criteria of the acceptance or rejection in the rule database and comparing the criteria of the acceptance or rejection to the contextual differences between said reference document and said third document and if the criteria of the acceptance or rejection is met, applying the rule corresponding to the criteria to the contextual differences between said reference document and said third document; and;
   determining if there are further contextual differences between said reference document and said third document to which no rules apply; and
   presenting the remaining further contextual differences between said reference document and said third document to a user for evaluation for acceptance or rejection.

2. The method for reviewing documents as claimed in claim 1 wherein the analysis of the static components comprises aligning sentences in the reference document with sentences having contextually equivalent content in the secondary document; and evaluating the content of the aligned sentences to determine if there are contextual differences.

3. The method for reviewing documents as claimed in claim 2 wherein the at least one reference document comprises two reference documents, a static reference document for completing the analysis of the static components of the secondary document; and a dynamic reference document for completing the analysis of the dynamic components of the secondary document.

4. The method for reviewing documents as claimed in claim 3 wherein the static reference document is a text document and the dynamic reference document is a structured data spreadsheet.

5. The method for reviewing documents as claimed in claim 4 wherein the dynamic analysis comprises using a rule parser to identify which data to be extracted from the secondary document and dynamic reference document.

6. The method for reviewing documents as claimed in claim 5 wherein the dynamic analysis further comprises using named entity recognition to categorize dynamic elements of the secondary document for comparison to categories with contextually equivalent content in the dynamic reference document.

7. The method of reviewing documents as claimed in claim 6 wherein the contextual differences between the reference document and the third document are presented to the user in the form of a chart.

8. The method of reviewing documents as claimed in claim 7 wherein the chart contains a viewer for displaying the portion of the at least one reference document or the third document which contains the contextual difference between the reference document and the third document.

9. The method of reviewing documents as claimed in claim 7 wherein the static reference document is a trade confirmation template, the secondary document is a trade confirmation and the dynamic reference document is the Global Banking and Market's book of record for a trade.

10. A system for reviewing documents comprising,
    a memory device that stores computer executable components;
    a processor that executes the computer executable components stored in memory, wherein the computer executable components comprise:
    a comparator component for determining differences between at least one reference document and a secondary document;
    wherein the comparator processes, via the processor, a comparison of the static components of the at least one reference document with the secondary document, and a comparison of the dynamic components of the at the least one reference document with the secondary document;

said comparator identifies contextual differences between the at least one reference document and the secondary document and presents the differences for review by a user; and further comprising a record of rules associated with a particular reference document for recording differences determined as acceptable in all comparisons to the at least one reference document;

the comparator component processing, via the processor, a comparison of the at least one reference document to a third document;

wherein the comparator processes, via the processor, a comparison of the static components of the at least one reference document with the third document, and a comparison of the dynamic components of the at the least one reference document with the third document;

said comparator identifies contextual differences between the at least one reference document and the third document;

the processor accessing the record of rules and omitting the differences previously determined as acceptable in all comparisons to the at least one reference document from the contextual differences between the at least one reference document and the third document to be presented to the user for review and presenting remaining differences between the at least one reference document and the third document to a user for review.

11. The system for reviewing documents as claimed in claim 10 wherein the comparison of the static components comprises aligning sentences in the reference document with sentences having contextual equivalent content in the secondary document; and evaluating the content of the aligned sentences to determine if there are any contextual differences.

12. The system for reviewing documents as claimed in claim 11 wherein the at least one reference document comprises two reference documents, a static reference document for completing the analysis of the static components of the secondary document; and a dynamic reference document for completing the analysis of the dynamic components of the secondary document.

13. The system for reviewing documents as claimed in claim 12 wherein the static reference document is a text document and the dynamic reference document is a structured data spreadsheet.

14. The system for reviewing documents as claimed in claim 13 wherein the dynamic comparison comprises using a rule parser to identify which data to be extracted from the secondary document and dynamic reference document.

15. The system for reviewing documents as claimed in claim 14 wherein the dynamic comparison further comprises using named entity recognition to categorize dynamic elements of the third document for comparison to contextually equivalent categories in the dynamic reference document.

16. The system for reviewing documents as claimed in claim 15 wherein the differences between the reference document and the third document are presented to the user in the form of a chart.

17. The system for reviewing documents as claimed in claim 16 wherein the chart contains a viewer for displaying the portion of the at least one reference document or the third document which contains a difference.

18. The system for reviewing documents as claimed in claim 17 further comprising a database for storing reference templates and rules previously identified as acceptable associated with a particular reference template.

19. The system for reviewing documents as claimed in claim 18 wherein the static reference document is a trade confirmation template, the secondary document is a trade confirmation, and the dynamic reference document is the Global Banking and Market's book of record for a trade.

* * * * *